United States Patent
Han et al.

(10) Patent No.: US 8,495,276 B2
(45) Date of Patent: Jul. 23, 2013

(54) POWER SAVING OPTIMIZATION FOR DISK DRIVES WITH EXTERNAL CACHE

(75) Inventors: Chungi Han, San Jose, CA (US); Donald J. Molaro, Cupertino, CA (US)

(73) Assignee: HGST Netherlands B.V., Amsterdam (NL)

( * ) Notice: Subject to any disclaimer, the term of this patent is extended or adjusted under 35 U.S.C. 154(b) by 1111 days.

(21) Appl. No.: 11/974,275

(22) Filed: Oct. 12, 2007

(65) Prior Publication Data

US 2009/0100216 A1    Apr. 16, 2009

(51) Int. Cl.
*G06F 12/00* (2006.01)
(52) U.S. Cl.
USPC ............ 711/103; 713/320; 711/170; 711/118
(58) Field of Classification Search
USPC ......................... 711/103, 118, 170; 713/320
See application file for complete search history.

(56) References Cited

U.S. PATENT DOCUMENTS

| | | | |
|---|---|---|---|
| 5,493,668 A | 2/1996 | Elko et al. | |
| 5,586,291 A | 12/1996 | Lasker et al. | |
| 5,701,516 A | 12/1997 | Cheng et al. | |
| 6,263,399 B1 * | 7/2001 | Hwang | 711/103 |
| 6,295,577 B1 | 9/2001 | Anderson et al. | |
| 6,594,724 B1 | 7/2003 | Smith | |
| 6,941,423 B2 | 9/2005 | Coulson | |
| 7,120,758 B2 | 10/2006 | Jones et al. | |
| 7,127,560 B2 | 10/2006 | Cohen et al. | |
| 7,181,509 B2 | 2/2007 | Soejima et al. | |
| 7,451,332 B2 * | 11/2008 | Culbert et al. | 713/320 |
| 7,516,348 B1 * | 4/2009 | Ofer | 713/324 |
| 2005/0246487 A1 * | 11/2005 | Ergan et al. | 711/113 |
| 2006/0075185 A1 | 4/2006 | Azzarito et al. | |
| 2006/0248387 A1 * | 11/2006 | Nicholson et al. | 714/22 |
| 2006/0253650 A1 * | 11/2006 | Forrer et al. | 711/113 |

FOREIGN PATENT DOCUMENTS

| | | |
|---|---|---|
| EP | 0490525 | 6/1992 |
| JP | 08006859 | 1/1996 |
| JP | 10124397 | 5/1998 |
| JP | 2005165528 | 6/2005 |
| JP | 2005301419 | 10/2005 |
| WO | WO-03034230 | 4/2003 |

OTHER PUBLICATIONS

"What is Robson?—Definition from Whatis.com", Apr. 12, 2007, SearchStorage.com Definitions, As retrieved from http://searchstorage.techtarget.com using search tem "robson" on Jan. 3, 2011.*
Bisson, et al., "NV Cache: Increasing the Effectiveness of Disk Spin-Down Algorithms With Caching", (Sep. 2006),422-432.

(Continued)

*Primary Examiner* — Matthew Bradley

(57) ABSTRACT

A power conservation system implementable in a computer system. The system includes a non-volatile cache memory (NVCM) device for storing information. The NVCM device is operationally coupled to the computer system. The system also includes a data storage device coupled to the NVCM device. The data storage device is for storing said information. The system further includes a controller coupled to the NVCM device. The controller initiates an occurrence of writing the information in the NVCM device to the data storage device. The occurrence of writing causes powering up of the data storage device to which the data is to be written or from which data is to be retrieved.

16 Claims, 18 Drawing Sheets

OTHER PUBLICATIONS

Biswas, et al., "Performance Analysis of Distributed File Systems with Non-Volatile Caches", (Jul. 1993),252-262.

Thomasian, Alexander "Priority Queueing in Raid5 Disk Arrays Wtih an NVS Cache", (Jan. 1995),168-172.

Seagate, et al., "Seagate Innovation About to Deliver a Windows Vista-Ready Hybrid Drive", (Sep. 2006),1-4.

Lenovo, et al., "The Future—Hybrid and Solid State Hard Disk Drives", (Nov. 16, 2006),1-1.

Microsoft Tech, et al., "ReadyDrive and Hybrid Hard Drives", (2006),1-1.

Microsoft Windows, et al., "Windows PC Accelerators", (Nov. 30, 2006),1-16.

Moore, Charles W., "The 'Book Mystique: Will "Robson" Hybrid NAND/Flash Technology Be the "Next Big Thing" for Apple 'Books?", PBCentral.com, (1996),1-3.

Huh, Jungho et al., "Two-Level Cache for Distributed System in Raid 5 Disk Controller", (Aug. 2005),64-69.

* cited by examiner

POWER SAVING OPTIMIZATION FOR DISK DRIVES WITH EXTERNAL CACHE

TECHNICAL FIELD

The invention relates to the field of computer systems and hard disk drives.

BACKGROUND ART

Computer systems, e.g., desktop computer systems, laptop computer systems, server systems, personal digital assistants (PDAs), cellular telephones, digital music and digital video systems, and the like, have become part of everyday life, and as such, expectations and demands continually increase for improved efficiency and greater speed for manipulating, accessing and storing larger amounts of data.

Many of the above computer systems contain, in part, one or more direct access storage devices (DASD), e.g., a hard disk drive. A hard disk drive may include one or more magnetic hard disk(s) or drive(s) within an outer housing or base containing a spindle motor assembly having a central drive hub that rotates the disk. An actuator assembly includes a plurality of parallel actuator arms in the form of a comb that is movably or pivotally mounted to the base about a pivot assembly. A controller is also mounted to the base for selectively moving the comb of arms relative to the disk.

Each actuator arm has extending from it at least one cantilevered electrical lead suspension. A magnetic read/write transducer or head is mounted on a slider and secured to a flexure that is flexibly mounted to each suspension. The read/write heads magnetically read data from and/or magnetically write data to the disk. The level of integration called the head gimbal assembly (HGA) is the head and the slider, which are mounted on the suspension. The slider is usually bonded to the end of the suspension.

A suspension has a spring-like quality, which biases or presses the air-bearing surface of the slider against the disk to cause the slider to fly at a precise distance from the disk. Movement of the actuator by the controller causes the head gimbal assemblies to move along radial arcs across tracks on the disk until the heads settle on their set target tracks. The head gimbal assemblies operate in and move in unison with one another or use multiple independent actuators wherein the arms can move independently of one another.

During computer system operation, the hard disks are rotated and the actuator arms are positioned such that the read/write heads extending there from are located over specific regions of the hard disk to access the information stored thereon or to store information thereon, thus depleting or drawing power. Hard disk drives of the type described above may be referred to as mechanical data storage devices. Optical and similar storage devices and drives may also be referred to as mechanical data storage devices.

Within most computer systems, heat is generated, in part, by the processor(s). To that extent, a heat sink and/or processor fan are commonly implemented for processor heat dissipation. Further, in computer systems having a DASD, as described above, there is also heat generated, in part, by the hard disk drive during operation, e.g., read and write processes. It is noted that server computer systems are commonly configured with multiple DASDs in which the number of DASDs may range from one to hundreds or more. As such, hard disk drives in server computer systems can generate a significant amount of regional heat during their operation.

Further, current computer systems that include one or more DASDs are configured such that there is consistent operational power being supplied to the DASD. Within portable computers, e.g., a laptop or other computer system having an expendable power supply, consistent operational powering of the hard disk drive(s) is known to consume a substantial portion of the available power.

SUMMARY OF THE INVENTION

A power conservation system for implementation in a computer system is described.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a computer system and components connected within. The discussion will then focus on embodiments of the invention that provide power conservation and heat reduction to the computer system, in an embodiment of the present invention.

Although embodiments of the present invention will be described in conjunction with a computer system having one or more hard disk drives, it is understood that the embodiments described herein are useful outside of the art of computer systems, such as devices requiring decreased power consumption and reduced heat generation. The computer system upon which embodiments of the present invention may be practiced is provided herein merely for purposes of brevity and clarity.

Figure 1:
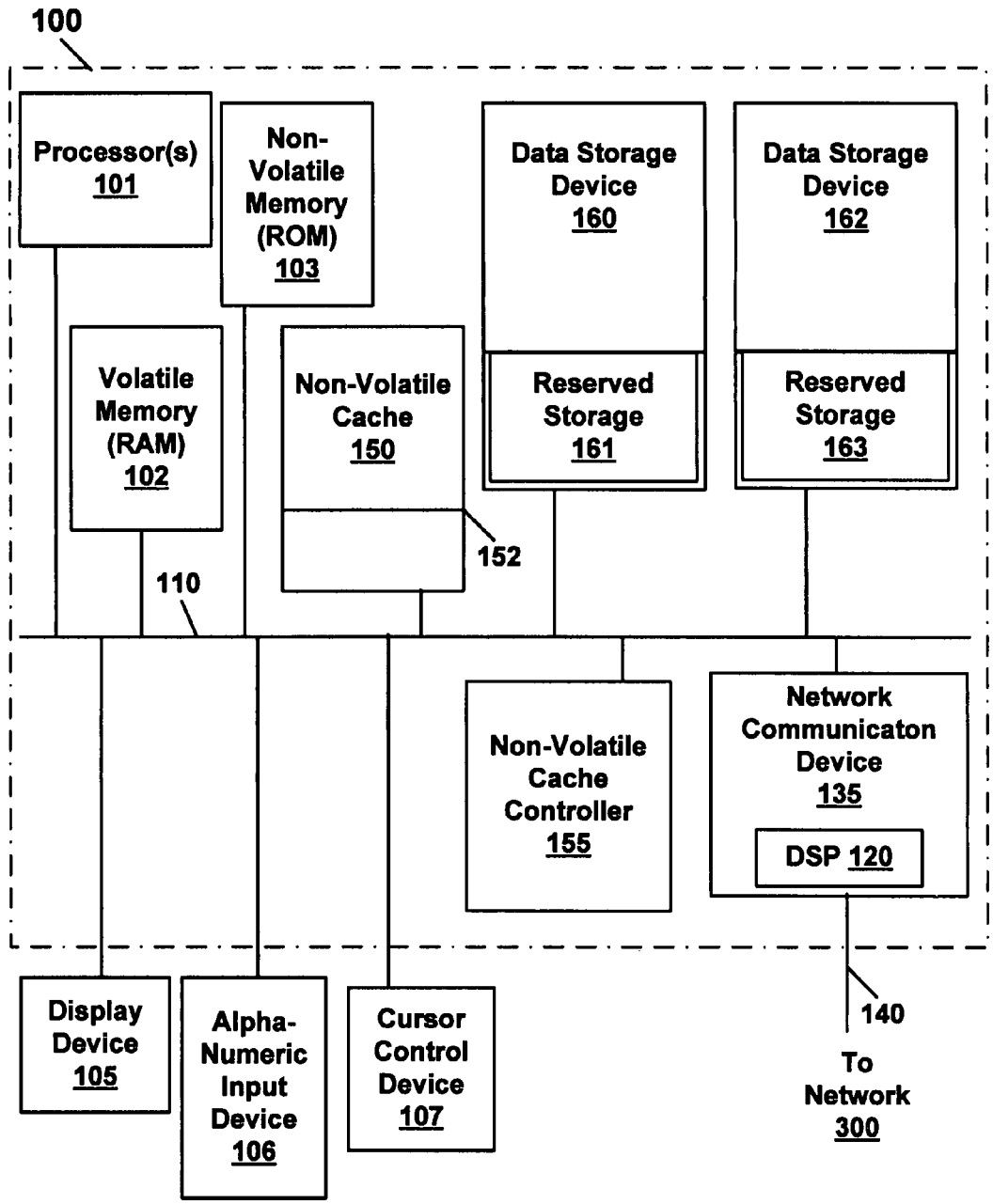
FIG. 1 is block diagram of components in a computer system that may be implemented in accordance with embodiments of the present invention and upon which embodiments of the present invention may be practiced.

FIG. 1 is a block diagram illustrating an exemplary computer system 100 upon which embodiments of the present invention may be practiced. It is noted that computer systems 100 and 200 can be nearly any type of computing system or electronic computing device including, but not limited to, a server computer, a desktop computer, a laptop computer, or other portable electronic device. Within the context of the present invention, certain discussed processes, procedures, and steps are realized as a series of instructions (e.g., a software program) that reside within computer system memory units of computer system 100 and which are executed by a processor(s) of computer system 100, in one embodiment. When executed, instructions cause computer system 100 to perform specific actions and exhibit specific behavior which is described in detail herein.

Computer system 100 of FIG. 1 comprises an address/data bus 110 for communicating information, one or more central processors 101 coupled to bus 110 for processing information and instructions. Central processor(s) 101 can be a microprocessor or any alternative type of processor. Computer system 100 also includes a computer usable volatile memory 102, e.g., random access memory (RAM), static RAM (SRAM), dynamic RAM (DRAM), synchronous dynamic RAM (SDRAM), double data rate RAM (DDR RAM), etc., coupled to bus 110 for storing information and instructions for processor(s) 101.

Computer system 100 further includes a computer usable non-volatile memory 103, e.g., read only memory (ROM), programmable ROM, electronically programmable ROM (EPROM), etc., coupled to bus 110 for storing static information and instructions for processor(s) 101. In an embodiment, non-volatile memory 103 can be removable.

System 100 also includes a non-volatile cache memory (NVCM) 150, e.g., flash memory, coupled to bus 110 for storing data and information and instructions for processor(s) 101. In an embodiment of the present invention, NVCM 150 includes a data block storage volume limit 152. In an embodiment of the present invention, NVCM 150 is NAND flash memory comprised of NAND gates.

A NAND gate is capable of having any Boolean function implemented therewith. In complicated logical expressions, including AND, OR, and NOT logic functions, writing these in terms of NAND yields a more compact result, thus requiring less memory space, and as such reduces storage cost. In an embodiment of the present invention, NVCM 150 is Robson cache memory by Intel®.

Computer 100 of FIG. 1 can also include one or more computer usable data storage device(s), e.g., hard disk drives 160 and 162, coupled to bus 110 for storing instructions and information, in an embodiment of the present invention. In an embodiment, data storage device 160 and 162 can be magnetic storage devices, e.g., hard disk drives, floppy disk drives, zip drives, or other magnetic storage device. In another embodiment, data storage device 160 and 162 can be an optical storage device, e.g., a CD (compact disc), a DVD (digital versatile disc), holographic storage or other alternative optical storage device. Alternatively, any combination of magnetic, optical, or other mechanically accessible and alternative storage devices can be implemented, e.g., in a RAID (random array of independent disks) configuration. It is noted that data storage devices 160 and 162 can be located internal and/or external of system 100 and communicatively coupled with system 100 utilizing wired and/or wireless communication technologies, thereby providing expanded storage and functionality to system 100. It is further noted that nearly any other computer system can also be communicatively coupled with system 100 via utilization of wired and/or wireless technologies, thereby expanding the functionality of system 100, as shown in network environment 300 of FIG. 3.

It is noted that data storage devices 160 and 162 may be analogous. Alternatively, data storage devices 160 and 162 may not be analogous, e.g., having different capacities, energy consumption requirements, data access times, formatting, performance, and the like. Within each data storage device 160 and 162, there is a reserve data portion contained therein, e.g., reserve data portions 161 and 163 respectively. In accordance with an embodiment of the present invention, reserve data portions 161 and 163 are configured to store data offloaded from non-volatile cache memory 150. In an embodiment of the present invention, the storage capacity of reserve data portion 161 is analogous to the storage capacity of reserve data portion 163. In an alternative embodiment, reserve data portions 161 and 163 are comprised of differing storage capacities.

Computer system 100 also includes a cache controller, e.g., NVCM controller 155. In an embodiment of the present invention, NVCM controller 155 is configured to translate computer system 100's PCI signals to NVCM 150 and manage the utilization of memory blocks of NVCM 150. NVCM controller 155 is further configured to manage BIOS-level option code for controlling NVCM 150 access before loading of the operating system, drivers, etc., as well as managing separation handling, thereby maintaining data integrity.

Figure 2:
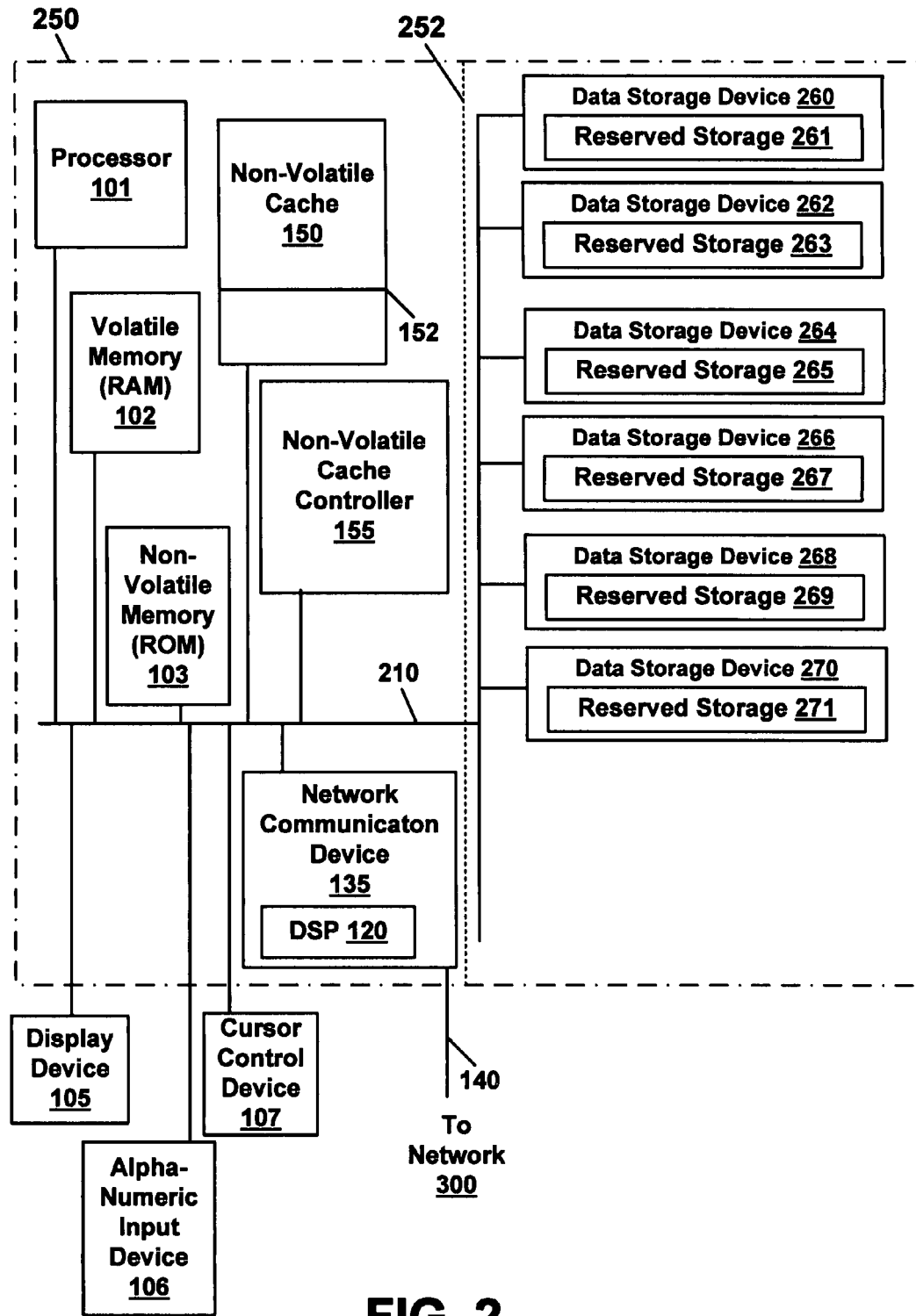
FIG. 2 is a block diagram of components in a server computer system that may be implemented in accordance with embodiments of the present invention and upon which embodiments of the present invention may be practiced.

In accordance with embodiments of the present invention, it is noted that NVCM controller 155 is configurably enabled to control, monitor and analyze the state of NVCM 150 (e.g., capacity, available space, time intervals between emptying processes, data block types located therewithin, designated data storage device locations of data blocks subject to a writing process, operator initiated write process, etc.), the data block storage volume limit 152 and the state of those data storage devices coupled therewith, e.g., data storage devices 160 and 162. State of a data storage device may include, but is not limited to, capacity, available space, access time, power requirements, location (relative to other data storage devices, e.g., drives disposed in RAID servers and the like, as shown in FIG. 2), operating state (on/off), capacities of reserved storage area, e.g., reserved storage 161 and 163, data type categorization, data block locations, and the like.

NVCM controller 155 is further configured to regulate the application of power to those data storage devices coupled therewith, e.g., data storage devices 160 and 162 in FIG. 1, FIGS. 4A-4C and FIGS. 5A-5E, as well as data storage devices 260, 262, 264, 266, 268 and 270 of FIGS. 6A-6F, in an embodiment of the present invention. As such, during writing data from NVCM 150 to an alternative storage device, e.g., a hard disk drive, NVCM controller 155 is enabled to selectively enable power to be applied to, and subsequent to completing a writing process cease the applied power to, the data storage device to which the data block is to be written. NVCM controller 155 is additionally configured to enable powering up and powering down the associated data storage devices during synchronization of the data blocks, e.g., data storage device 160 and data storage device 162 of FIGS. 4A-4C and 5A-5E and data storage devices 260, 262, 264, 266, 268 and 270 of FIGS. 6A-6F.

By providing selective powering up and powering down functionality for hard disk drives in a computer system, e.g., data storage devices 160 and 162, as well as data storage devices 260, 262, 264, 266, 268 and 270 of FIGS. 6A-6F, such that power is provided to the hard disk drive when reading data from or writing to the hard disk drive, embodiments of the present invention provide power conservation. It is noted that embodiments of the present invention are well suited for providing power conservation in computing systems using a constant power supply environment, e.g., desktop computer systems, server systems, etc., and in an environment having a limited or exhaustible power supply, e.g., a laptop and other portable computer system.

Figure 3:
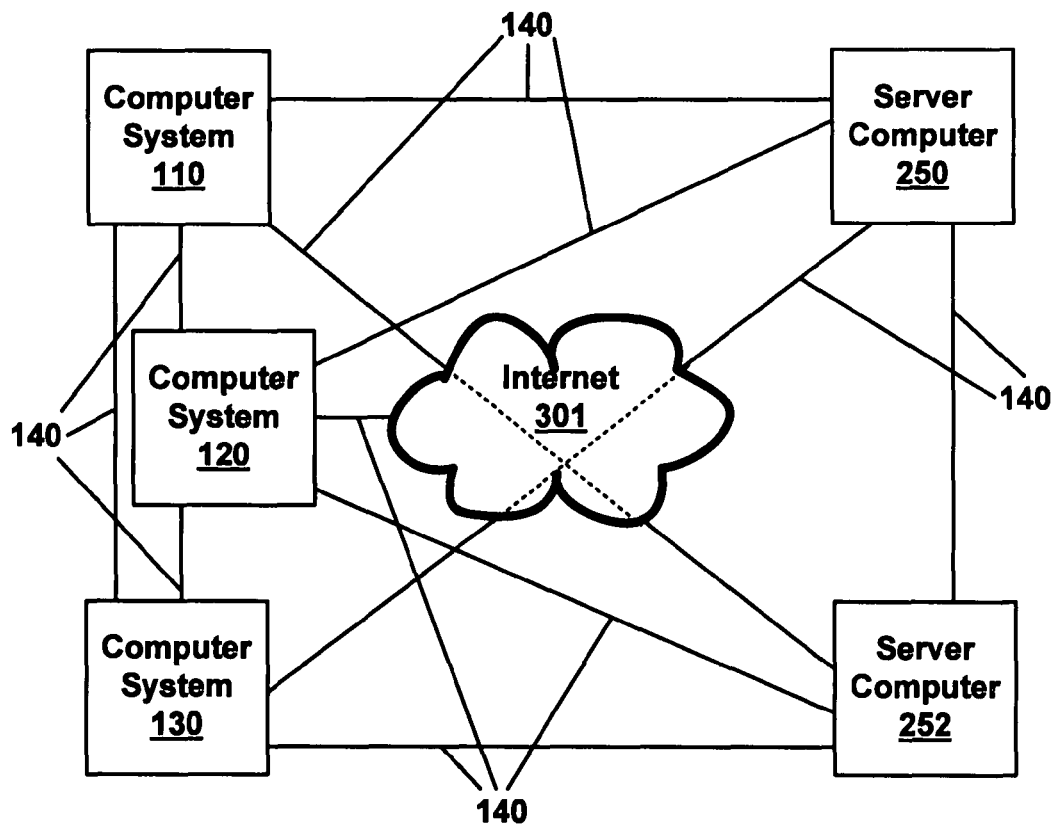
FIG. 3 is a block diagram of a network environment in which embodiments of the present invention may be practiced.

System 100 also includes one or more network communication interface devices, e.g., signal input/output device(s) 135 coupled to bus 110 for enabling computer 100 to interface with other electronic devices, as shown in network 300 of FIG. 3, via link 140. Communication interface 135 can include wired and/or wireless communication functionality. For example, in one embodiment, communication interface 135 is an Ethernet adapter, but can alternatively be one of a number of well known communication standards and protocols, e.g., a parallel port, a serial communication port, a FireWire (IEEE 1394) interface, a Universal Serial Bus (USB), a small computer system interface (SCSI), an infrared (IR) communication port, a Bluetooth wireless communication adapter, a broadband connection, and the like. In another embodiment, a digital subscriber line (DSL) can be implemented as signal input/output device 135. In such an instance, communication interface 135 may include a DSL modem.

Still referring to FIG. 1, network communication device 135, in an embodiment, includes an optional digital signal processor (DSP) 120 for processing data to be transmitted or data that are received via network communication device 135. Alternatively, processor 101 can perform some or all of the functions performed by DSP 120.

System 100 can also include an optional display device 105 coupled to bus 110 for displaying video, graphics, and/or alphanumeric characters. It is noted that display device 105 can be a CRT (cathode ray tube), a thin CRT (TCRT), a liquid crystal display (LCD), a plasma display, a field emission display (FED) or any other display device suitable for displaying video, graphics, and alphanumeric characters recognizable to a user.

Computer system 100 of FIG. 1 further includes an optional alphanumeric input device 106 coupled to bus 110 for communicating information and command selections to processor(s) 101, in one embodiment. Alphanumeric input device 106 is a keyboard coupled to bus 110 and includes alphanumeric and function keys. Also included in computer 100 is an optional cursor control device 107 coupled to bus 110 for communicating user input information and command selections to processor(s) 101. Cursor control device 107 can be implemented using a number of well known devices such as a mouse, a trackball, a track pad, a joy stick, a optical tracking device, a touch screen, etc. It is noted that a cursor can be directed and/or activated via input from alphanumeric input device 106 using special keys and key sequence commands. It is further noted that directing and/or activating the cursor can be accomplished by alternative means, e.g., voice activated commands, provided computer system 100 is configured with such functionality.

FIG. 2 is a block diagram illustrating a server type computer system 250 upon which embodiments of the present invention may be practiced. Computer system 250, functionally analogous to computer system 100 of FIG. 1, further includes a plurality of hard disk drives, e.g., data storage devices 260, 262, 264, 266, 268 and 270. It is noted that data storage devices 260, 262, 264, 266, 268 and 270, each comprising a reserved storage portion 261, 263, 265, 267, 269 and 271, respectively, can be located within computer system 250, or located external to system 250 (shown as dotted line 252) and communicatively coupled with system 250 utilizing bus 110 and/or wired and/or wireless communication technologies, thereby providing expanded storage and functionality to system 250/252.

In an embodiment of the present invention, NVCM controller 155 is configured to determine the state of each of the drives coupled therewith, as described herein with reference to NVCM controller 155 of FIG. 1. In an embodiment, NVCM controller is further configured to analyze location information of each drive relative to other drives, such that embodiments of the present invention enable selective operation and synchronization of the drives in computer system 250/252, and which are described herein with reference to FIGS. 6A-6F.

FIG. 3 is a block diagram of an exemplary network 300 upon which embodiments of the present invention may be practiced. In an example, network 300 enables one or more client computer systems (e.g., 110, 120, and 130), each of which are coupled to Internet 301, via communicative link 140, to receive data from and/or send data to a server, e.g., 250 and/or 252, via the Internet 301. In another embodiment, each computer system 110, 120 and 130 and server computer system 250 and 252 are coupled via an intranet via communicative link 140, obviating Internet 301 use.

Network 300 includes a server 250 and a server 252 which are communicatively coupled to Internet 301. Further, server 250 and server 252 can be communicatively coupled without utilizing Internet 301, as shown. Server 250, server 252, and computer systems 110, 120, and 130 can communicate with each other. It is noted that computers and servers of network 300 are well suited to be communicatively coupled in various implementations. For example, server 250, server 252, and computer systems 110, 120, and 130 of network 300 can be communicatively coupled via wired communication technology, e.g., twisted pair cabling, fiber optics, coaxial cable, etc., or wireless communication technology, or a combination of wired and wireless communication technology.

Still referring to FIG. 3, it is noted that server 250, server 252, and computer systems 110, 120 and 130 of network 300 can, in one embodiment, be each implemented in a manner similar to computer system 100 of FIG. 1. However, the server and computer systems in network 300 are not limited to such implementation. Additionally, server 250 and server 252 can perform various functionalities within network 300. It is also noted that, in one embodiment, server 250 and server 252 can both be disposed on a single or a plurality of physical computer systems, e.g., computer system 100 of FIG. 1.

Figure 4A:
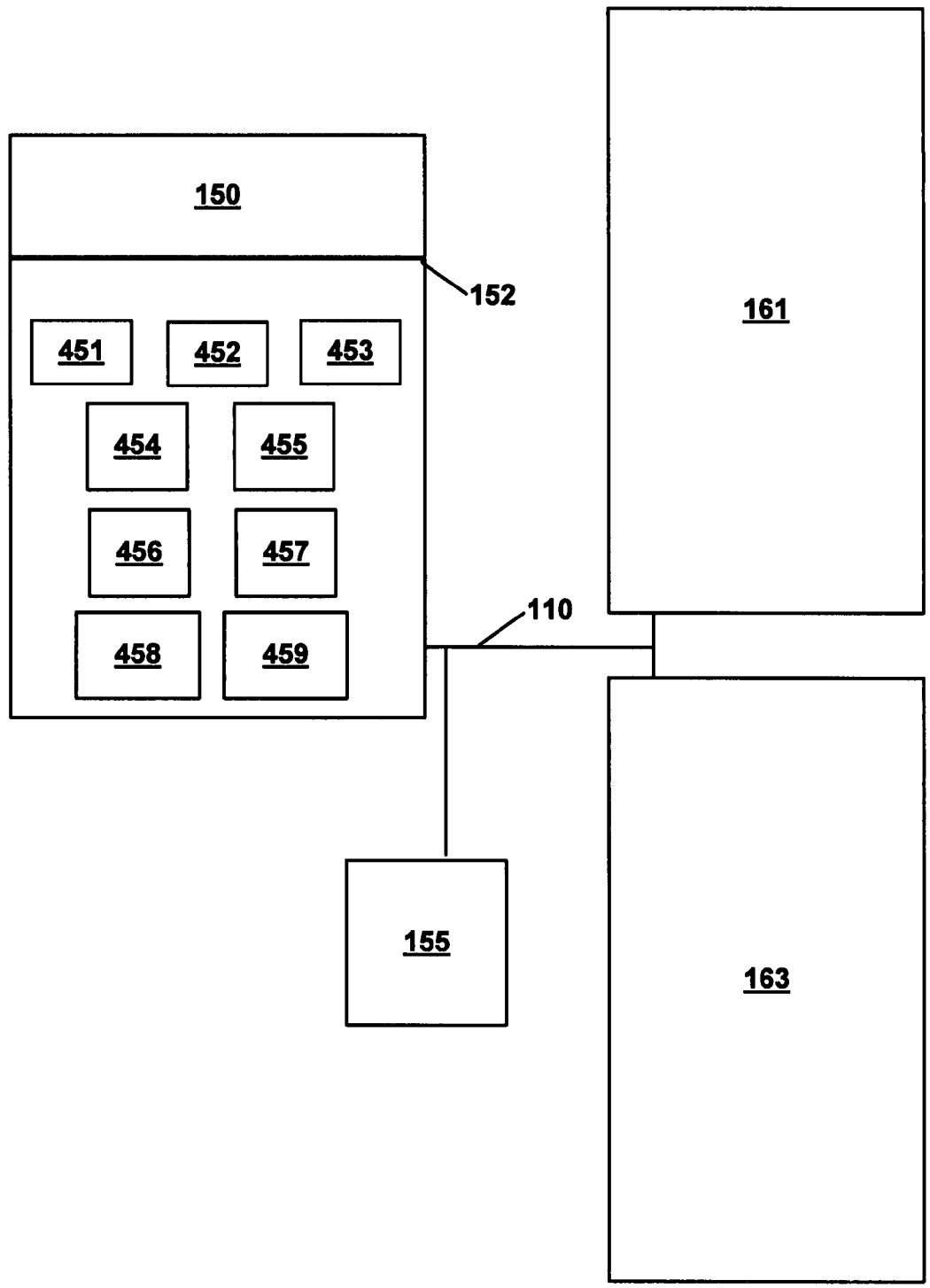
FIG. 4A is an expanded view of a portion of the components and data storage devices in the computer system of FIG. 1, in accordance with an embodiment of the present invention.

FIG. 4A is an expanded block diagram 400 view of a portion of components and data storage devices, of computer system 100 of FIG. 1. FIG. 4A includes non-volatile cache storage NVCM 150 and NVCM controller 155, as described herein with reference to FIG. 1, coupled to reserve storage portions 161 and 163 of data storage devices 160 and 162 via bus 110.

In FIG. 4A, NVCM 150 includes a storage volume limit, e.g., storage limit level 152 that is managed by a controller, e.g., NVCM controller 155 of FIG. 1, in an embodiment of the present invention. NVCM controller 155 manages the amount of data stored within NVCM 150 so as prevent exceeding of storage limit level 152. The criteria applied to storage limit level 152 can be derived from, but which is not limited to, usable space in NVCM 150, a percentage of total available storage in NVCM 150, remaining storage capacity of NVCM 150 and/or alternative criteria, and/or in a combination thereof.

Further, NVCM controller 155 is configurable to initiate when and to where data is to be written and/or from where data is to be retrieved, in accordance with an embodiment of the present invention. For example, a requested data block may be retrieved from any of the data storage devices that may be coupled to bus 110 of computer system 100.

Still referring to FIG. 4A, during operation of computer system 100, data may be generated, e.g., a document, a graphic file, an audio/video media file, network information or other data is created, and is stored as a data block in NVCM 150, in an embodiment of the present invention. In another embodiment of the present invention, data, upon which changes are to be made, may be retrieved from a data storage device, e.g., data storage device 160 or 162, dependent upon data location, and stored in NVCM 150. In still another embodiment of the present invention, data may be retrieved from reserved data portion 161 or 163 of data storage devices 160 and 162, respectively, and stored in NVCM 150.

Shown within NVCM 150 are data blocks 451, 452, 453, 454, 455, 456, 457, 458 and 459, that have been created and/or retrieved from a data storage device, e.g., data storage devices 160 and/or 162, in an embodiment of the present invention. In accordance with an embodiment of the present invention, the amount of storage space utilized by data blocks 451-459 is approaching storage volume limit indicator 152 of NVCM 150. In an embodiment of the present invention, NVCM controller 155 causes NVCM 150 to write data blocks 451-459 to an available hard disk drive, as shown in FIG. 4B.

Figure 4B:
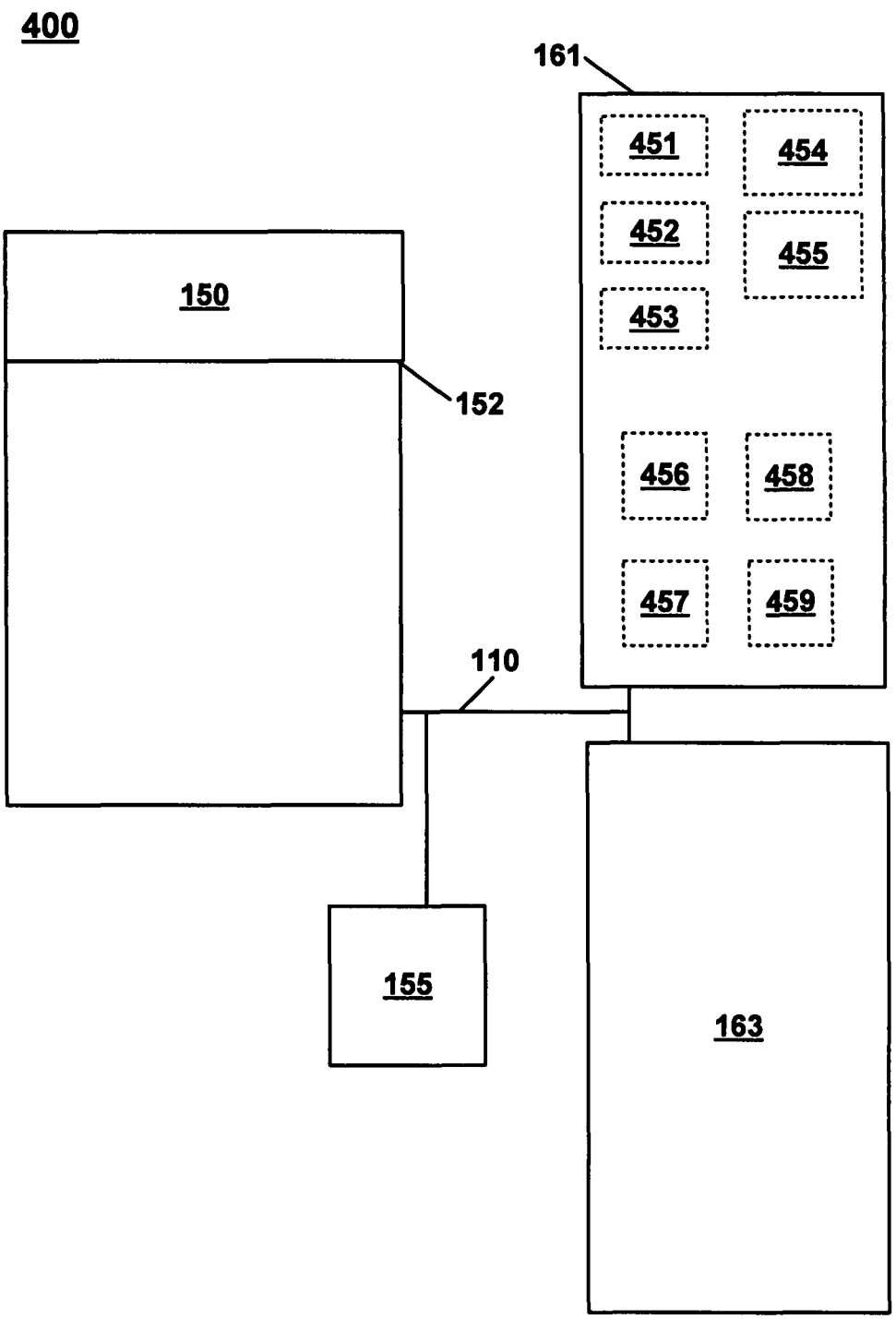
FIG. 4B is a sequential block diagram of FIG. 4A in accordance with the present embodiment of the invention.

FIG. 4B, a sequential block diagram of FIG. 4A, shows that data blocks 451-459 have been written to reserved data portion 161 of data storage device 160, in an embodiment of the present invention. In accordance with an embodiment of the present invention, NVCM controller 155 enables powering up data storage device 160 to facilitate the writing of data blocks 451-459 to device 160's reserve data portion 161. Alternatively, data blocks 451-459 may be written to reserved data portion 163 of data storage device 162. In an embodiment of the present invention, NVCM controller 155 marks, or otherwise indicates, data blocks 451-459 as unsynchronized, as indicated with a dashed line.

Upon completion of writing data blocks 451-459 to a data storage device, e.g., data storage device 160, the volume of storage space utilized by data blocks 451-459 in NVCM 150 is thus returned to usable data storage space within NVCM 150, as well as powering down data storage device 160, as described herein with reference to NVCM controller 155 of FIG. 1.

Figure 4C:
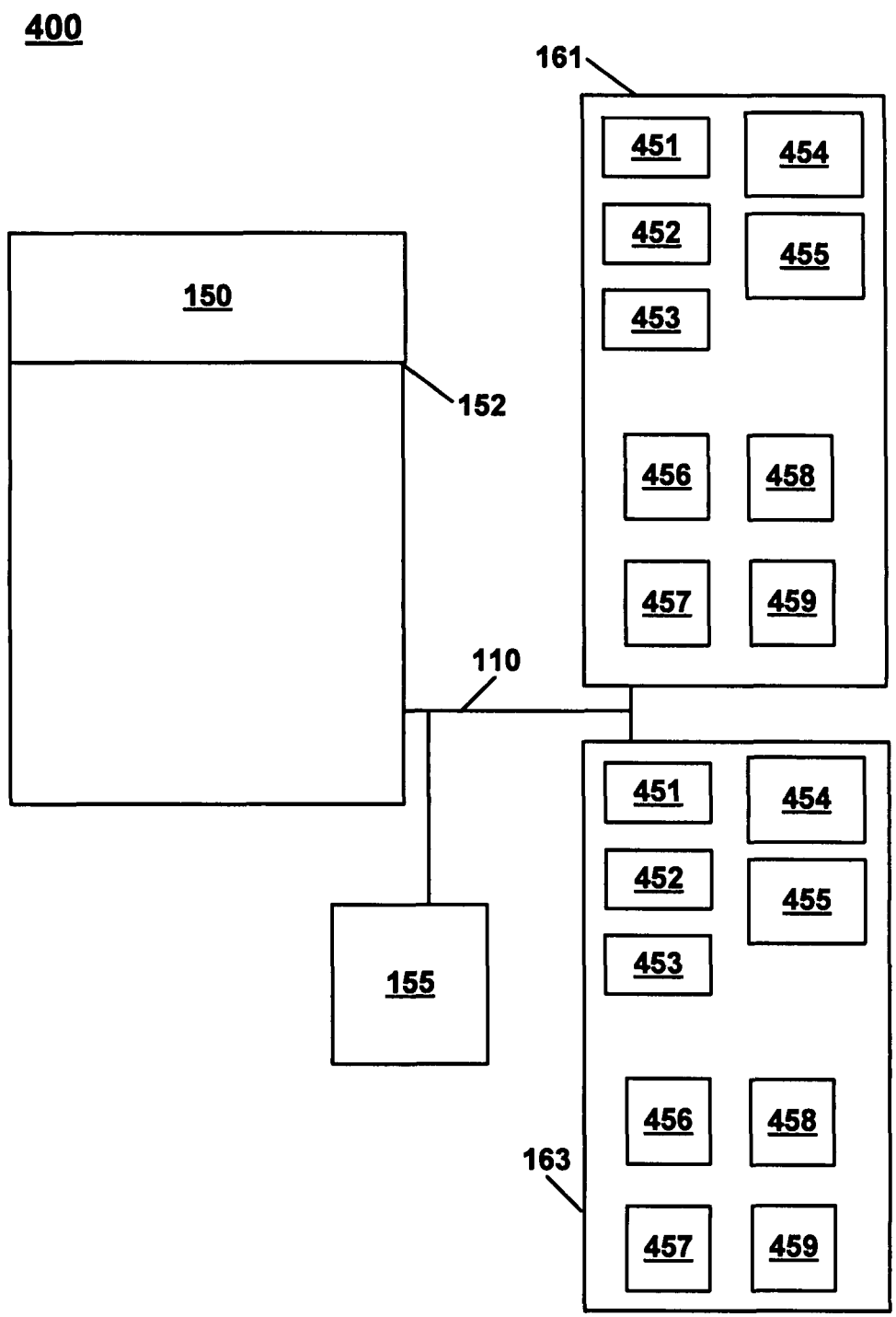
FIG. 4C is a sequential block diagram of FIG. 4B in accordance with the present embodiment of the invention.

Now referring to FIG. 4C, subsequent to writing data blocks 451-459 to reserved data portion 161 of data storage device 160, NVCM controller 155 is configured to cause synchronization of data blocks written to reserved data portion 161 of data storage device 160 with reserved data portion 163 of data storage device 162 in an embodiment of the present invention. Synchronization may be initiated following writing of data blocks or may be initiated subsequent to other operations and/or processes being performed on or within computer system 100. It is noted that NVCM controller 155 enables selective powering up and powering down of the data storage devices during a synchronization process. Synchronization of data blocks in reserved data portion 161 and 163 provides duplication and data synchronization of data blocks stored therewithin, and are indicated by a solid line.

In an alternative embodiment, NVCM controller 155 can cause data blocks 451-459 to be initially written to reserved data portion 163 of data storage device 162 and subsequently synchronized with reserved data portion 161 of data storage device 160. In yet another embodiment of the present invention, NVCM controller 155 is configured to operationally interact with computer system 100 instructions, processes and applications such that computer system 100 may cause synchronization of data blocks 451-459.

Figure 5A:
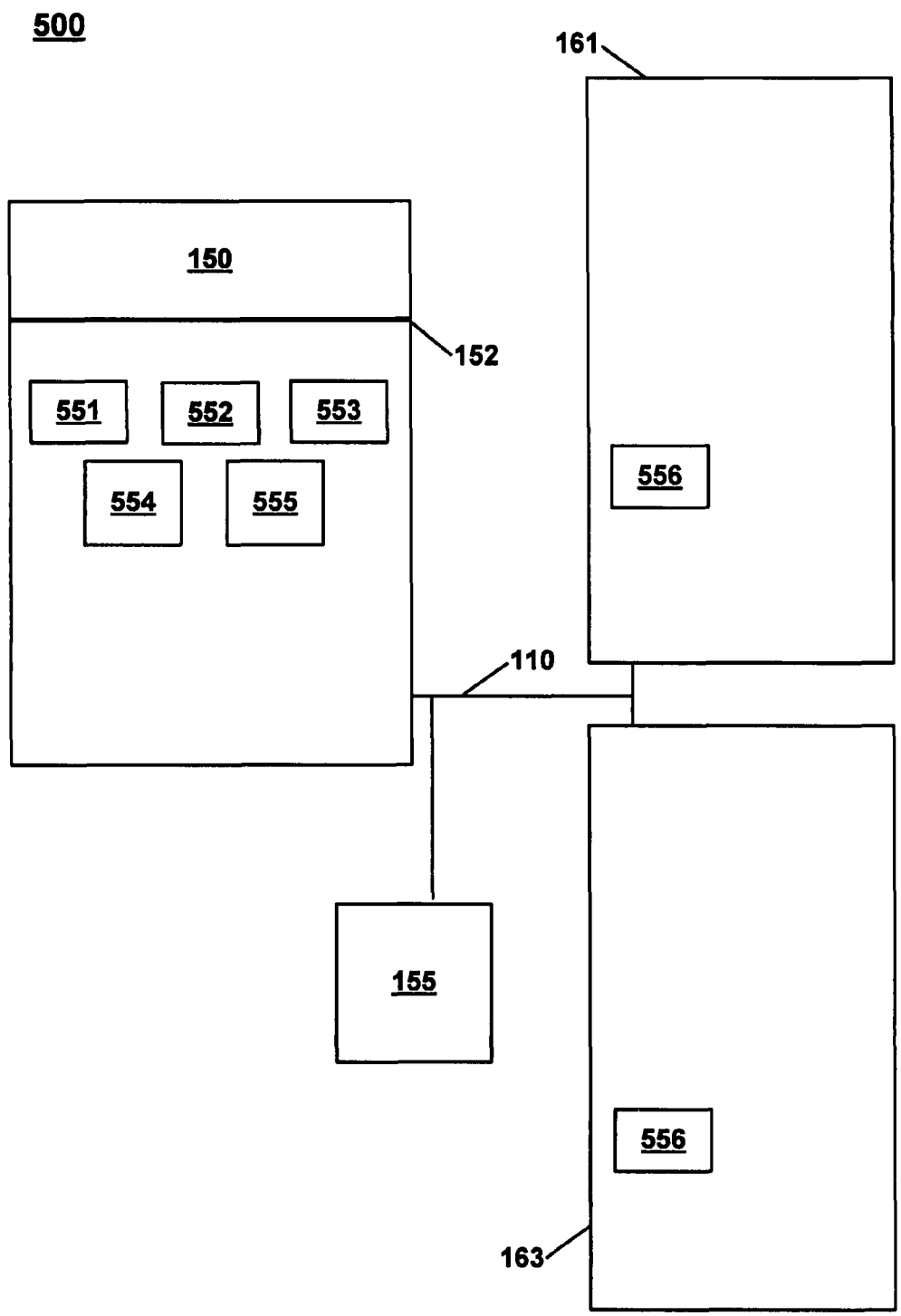
FIG. 5A is an expanded view of a portion of the components and data storage devices in the computer system of FIG. 1, in accordance with another embodiment of the present invention.

FIG. 5A is an expanded block diagram 500 of a portion of the components and data storage devices of computer system 100 of FIG. 1. Diagram 500 includes non-volatile cache storage NVCM 150 coupled to reserve storage portions 161 and 163 of data storage devices 160 and 162, respectively, via bus 110. Diagram 500 also includes an NVCM controller 155 as described herein with reference to FIG. 1.

NVCM 150 is shown to have disposed therein data blocks 551, 552, 553, 554, and 555 that have been created and/or retrieved from another data storage device, e.g., data storage devices 160 and/or 162, in an embodiment of the present invention. Additionally, a synchronized data block 556, indicated by a solid line, is shown in reserved data portion 161 and reserved data portion 163 of data storage devices 160 and 162, respectively.

Figure 5B:
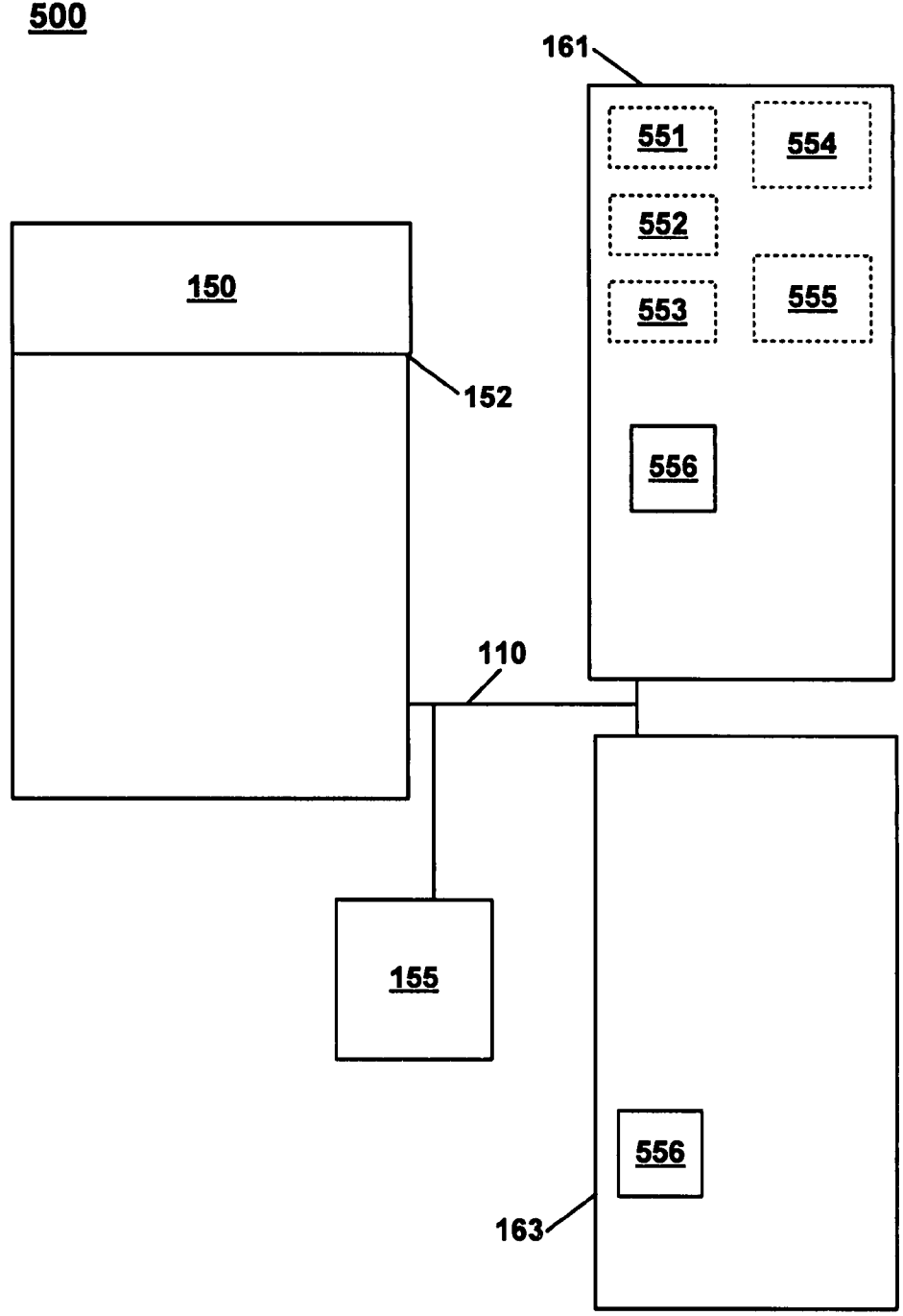
FIG. 5B is a sequential block diagram of FIG. 5A in accordance with the present embodiment of the invention.

In FIG. 5B, during operation of computer system 100, a data block is retrieved, e.g., data block 556. In an embodiment of the present invention, NVCM controller 155 determines the location(s) of the requested data block 556. NVCM controller 155 powers up one of the hard disk drives containing data block 556, accesses and retrieves data block 556, and stores data block in NVCM 150. In the present embodiment, NVCM controller 155 selected data block 556 located in reserve data portion 161. As such, NVCM controller 155 enables powering up of data storage device 160 in which data block is located. In accordance with an embodiment of the present invention, upon data block 556 being retrieved into NVCM 150, NVCM controller 155 marks, or otherwise indicates, that data block 556 is no longer synchronized, shown as a dashed line.

Additionally, while data storage device 160 is powered up, NVCM controller 155 is configured to cause data blocks 551-555 to be written to reserve portion 161 of data storage device 160, in an embodiment of the present invention. As such, NVCM controller 155 returns the storage volume allocated for data blocks 551-559 to usable storage space. In accordance with an embodiment of the present invention, data blocks 551-555 stored in reserve data portion 161 are unsynchronized, indicated with a dashed line. Subsequent to completion of the writing process of data blocks 551-555 to reserve data portion 161, NVCM controller 155 powers down operating data storage device 160, in an embodiment of the present invention.

Figure 5C:
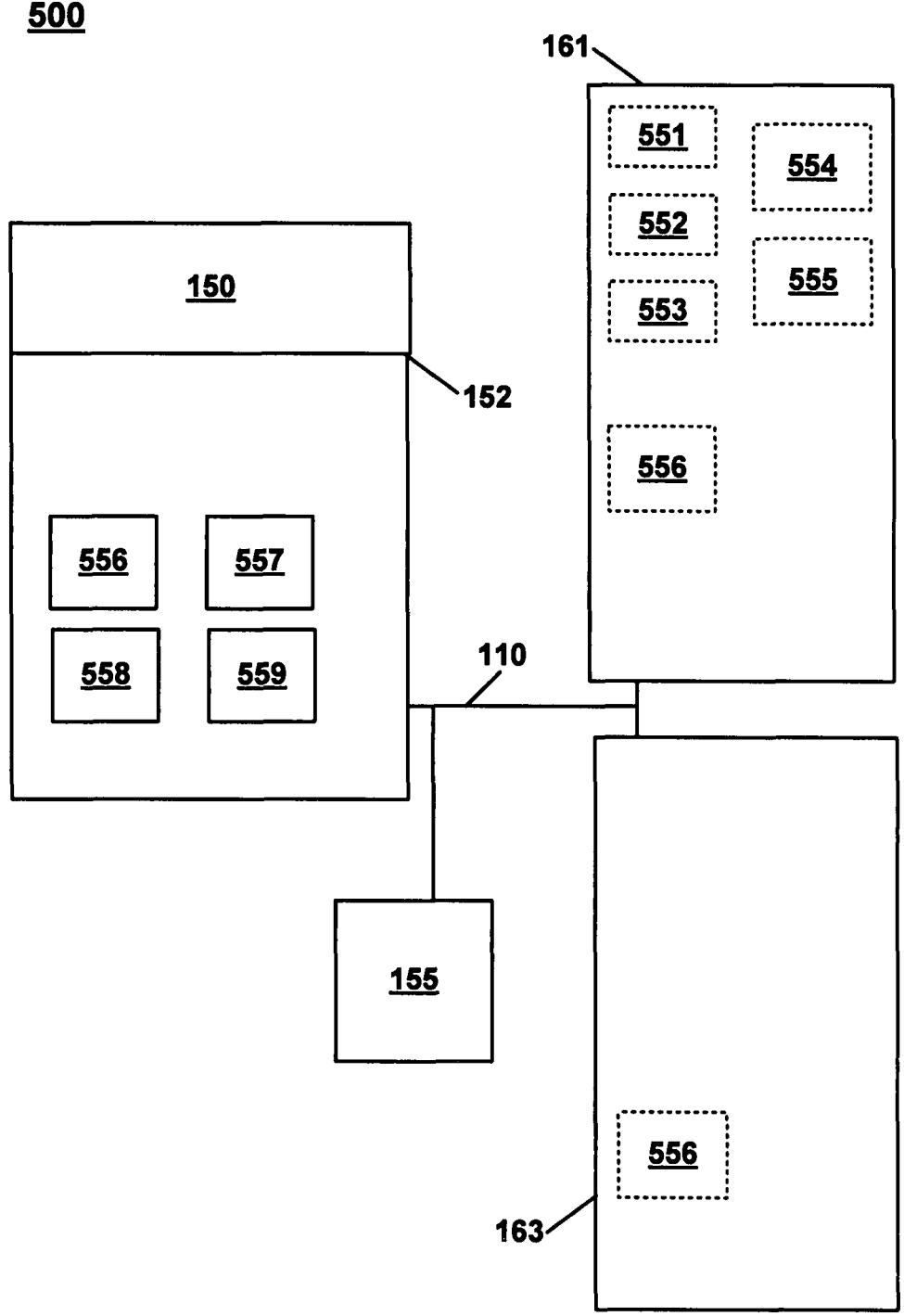
FIG. 5C is a sequential block diagram of FIG. 5B in accordance with the present embodiment of the invention.

In FIG. 5C, during subsequent computer system 100 operations, various data blocks were created, e.g., data blocks 557, 558 and 559 and are shown as stored in NVCM 150. Further, alteration of data block 556 has occurred. It is noted that during creation of data blocks 557-559 and alteration of data block 556, NVCM controller 155 has controlled, in this instance prevented, operating power being applied to data storage devices 160 and 161.

Figure 5D:
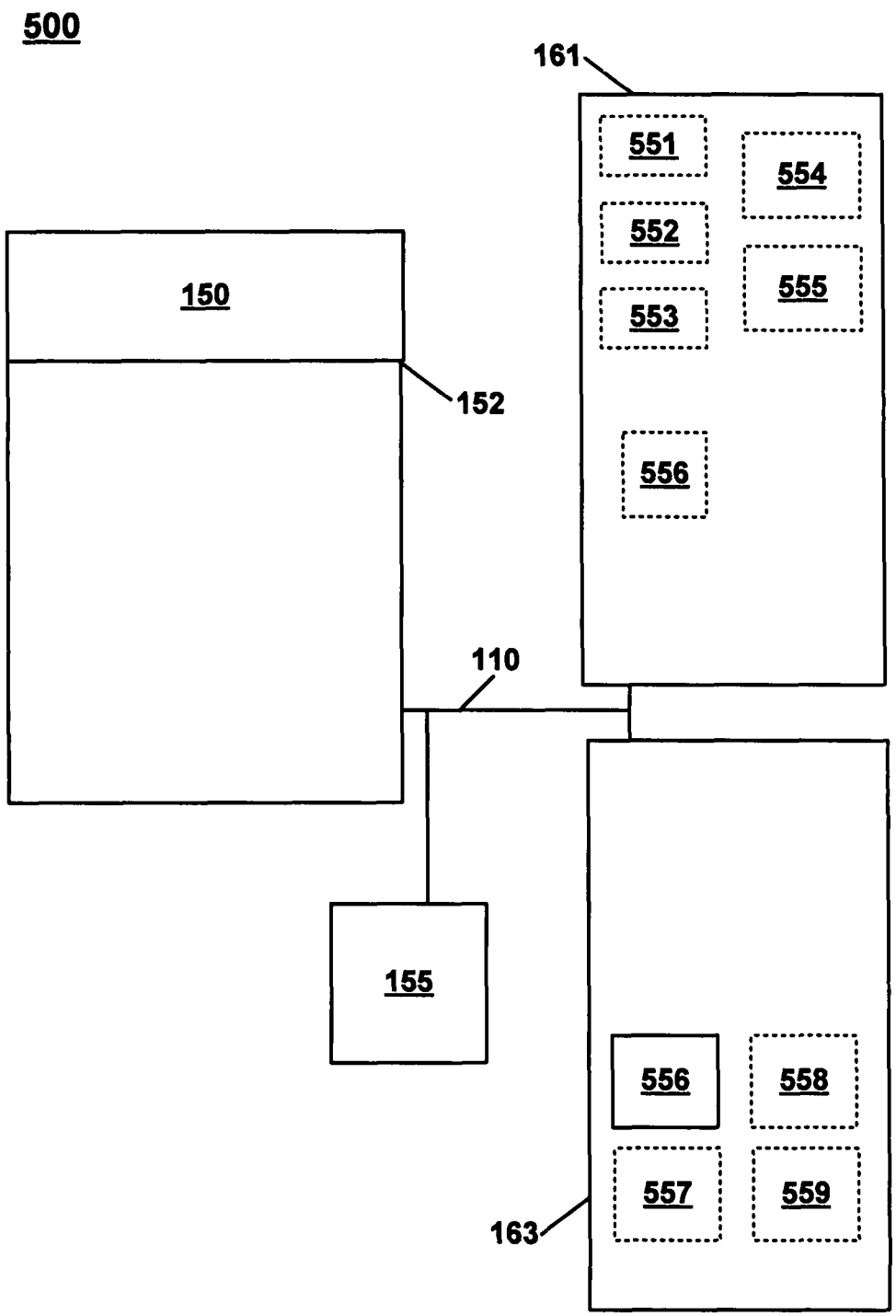
FIG. 5D is a sequential block diagram of FIG. 5C in accordance with the present embodiment of the invention.

In FIG. 5D, is a sequential block diagram of FIG. 5C subsequent to NVCM controller 155 initiating writing of data blocks contained in NVCM 150 to a hard disk drive, in an embodiment of the present invention. In the embodiment shown, NVCM controller 155 has initiated and completed a process for writing data blocks 556-559 to reserve data portion 163 of data storage device 162. In accordance with an embodiment of the present invention, NVCM controller 155 enables the powering up of data storage device 162 during the writing process concurrent with storage device 160 remaining un-powered.

In accordance with an embodiment of the present invention, NVCM controller 155 has marked data blocks 557-559 as unsynchronized, as indicated with a dashed line. Further, NVCM controller 155 has marked, or otherwise indicated, data block 556 as a more recent data block, compared with existing data blocks 556, indicated with a dotted line, in accordance with an embodiment of the present invention.

It is noted that synchronization of data blocks 551-555 and data block 556 of reserve data portion 161 and data blocks 556-559 of reserve portion 163 may be subsequently initiated by NVCM controller 155, in an embodiment of the present invention. Alternatively, and as described herein with reference to FIG. 4C, NVCM controller 155 may postpone synchronization. In accordance with an embodiment of the present invention, NVCM controller 155 enables the powering up and powering down of data storage device 160 and data storage device 162, facilitating synchronization.

Figure 5E:
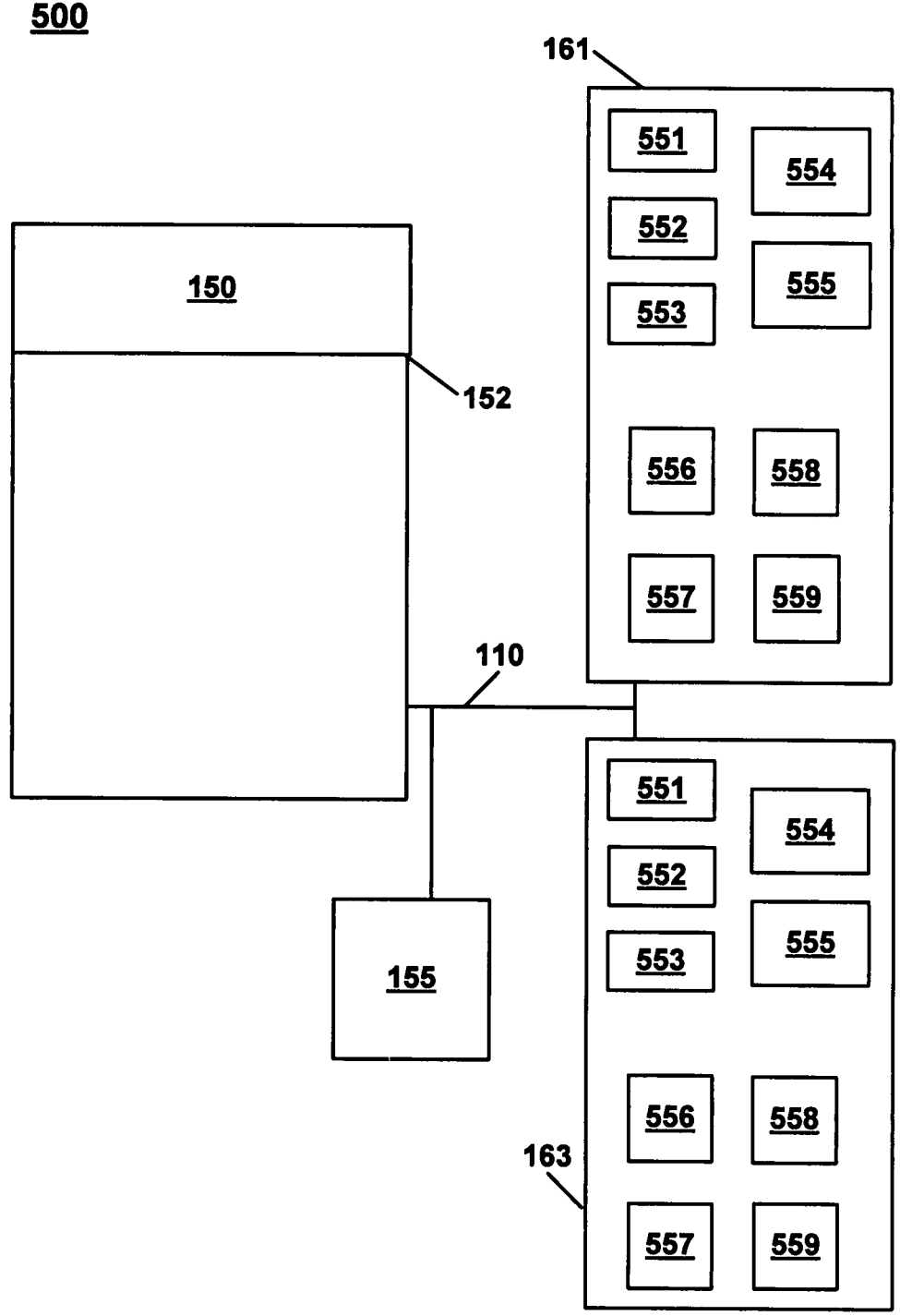
FIG. 5E is a sequential block diagram of FIG. 5D in accordance with the present embodiment of the invention.

FIG. 5E is a block diagram of FIG. 5D subsequent to a synchronization process performed on reserve data portion 161 of data storage device 160 and reserve data portion 163 of data storage device data 162, in accordance with an embodiment of the present invention. In the example shown, data block 556 of reserve portion 161 is synchronized to data block 556 of reserve data portion 163, data blocks 551-555 of reserve data storage 161 are synchronized to reserve data portion 163 and data blocks 557-559 of reserve data portion 163 are synchronized to reserve data storage 161, and as such synchronized data blocks 551-559 are indicated by a solid line.

It is noted that embodiments of the present invention, as described herein with reference to FIG. 1, FIGS. 4A-4C and FIGS. 5A-5E can be singularly or combinationally practiced upon hard disk drives in server computer system, e.g., data storage devices 260, 262, 264, 266, 268 and 270 of server computer system 200 of FIG. 2.

Figure 6A:
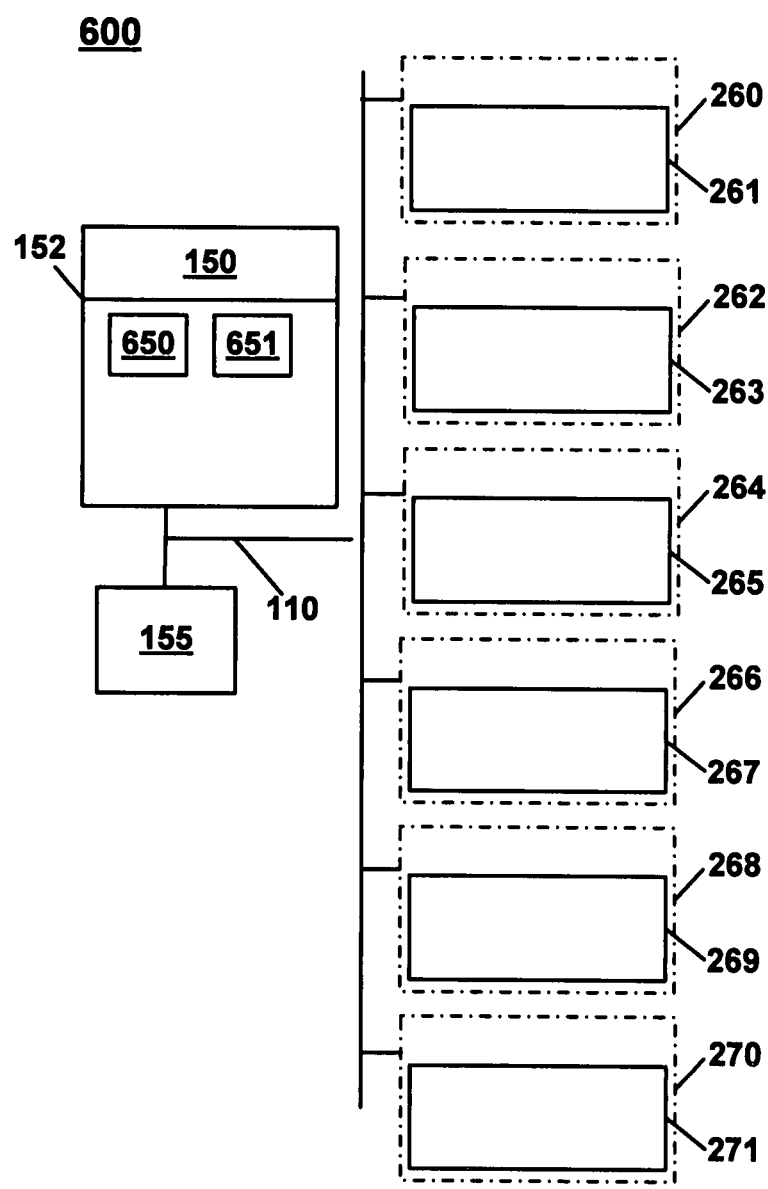
FIG. 6A is an expanded view of a portion of the components and data storage devices in the computer system of FIG. 2, in accordance with yet another embodiment of the present invention.

FIG. 6A is an expanded block diagram 600 of a portion of the components and data storage devices of computer system 200 of FIG. 2. Diagram 600 includes NVCM controller 155, as described herein with reference to FIGS. 1, 4A-4C, and 5A-5E, and non-volatile cache storage NVCM 150, as described herein with reference to FIGS. 1, 4A-4C and 5A-5E, which are coupled to data storage devices 260, 262, 264, 266, 268 and 270 via bus 110, in an embodiment of the present invention. It is noted that each data storage device 260, 262, 264, 266, 268 and 270 has allocated therewithin a reserve data portion, e.g., reserve data portions 261, 263, 265, 267, 269 and 271, respectively.

NVCM 150 is shown to have stored therein data blocks 651 and 652 that were created and/or retrieved from one or more data storage devices, e.g., data storage devices 260, 262, 264, 266, 268 and 270, in an embodiment of the present invention. In accordance with an embodiment of the present invention, and by virtue of there being no writing processes currently being performed on NVCM 150, NVCM controller 155 is regulating power applied to and for the data storage devices such that no power is being applied to data storage devices 260, 262, 264, 266, 268 and 270, indicated with a long dashed, double-dotted line.

Figure 6B:
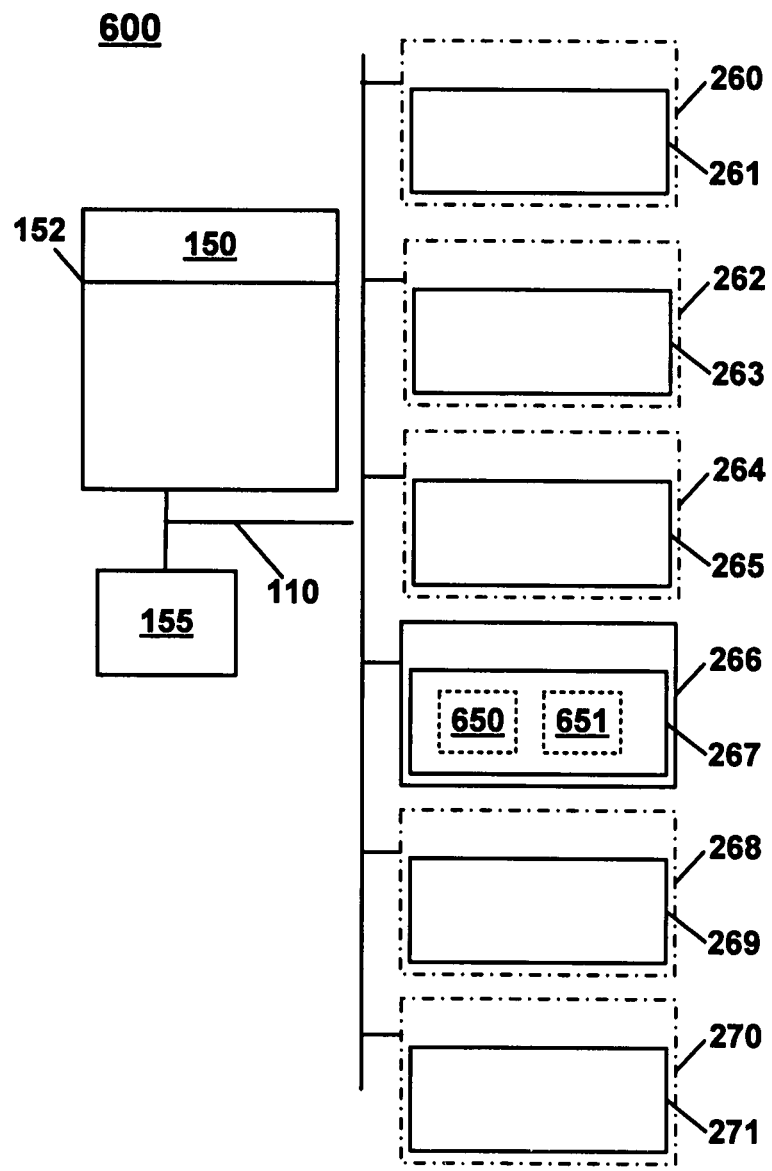
FIG. 6B is a sequential block diagram of FIG. 6A in accordance with the present embodiment of the invention.

FIG. 6B is sequential block diagram of FIG. 6A in which an operator initiated writing of data in NVCM 150 has occurred. In accordance with an embodiment of the present invention, NVCM controller 155 enables powering up of a hard disk drive, indicated by solid line 266, onto which the data blocks are to be written, reserve data portion 267 of data storage device 266 in the example shown. In an embodiment of the present invention, NVCM controller 155 marks, or otherwise indicates data blocks 650 and 651 are not synchronized, indicated by a dashed line.

Further, NVCM controller 155 has reallocated the vacated data storage space to usable data storage space in NVCM 150, in accordance with an embodiment of the present invention. Subsequent to completing the writing process, NVCM controller 155 powers down data storage device 266, in an embodiment of the present invention.

Figure 6C:
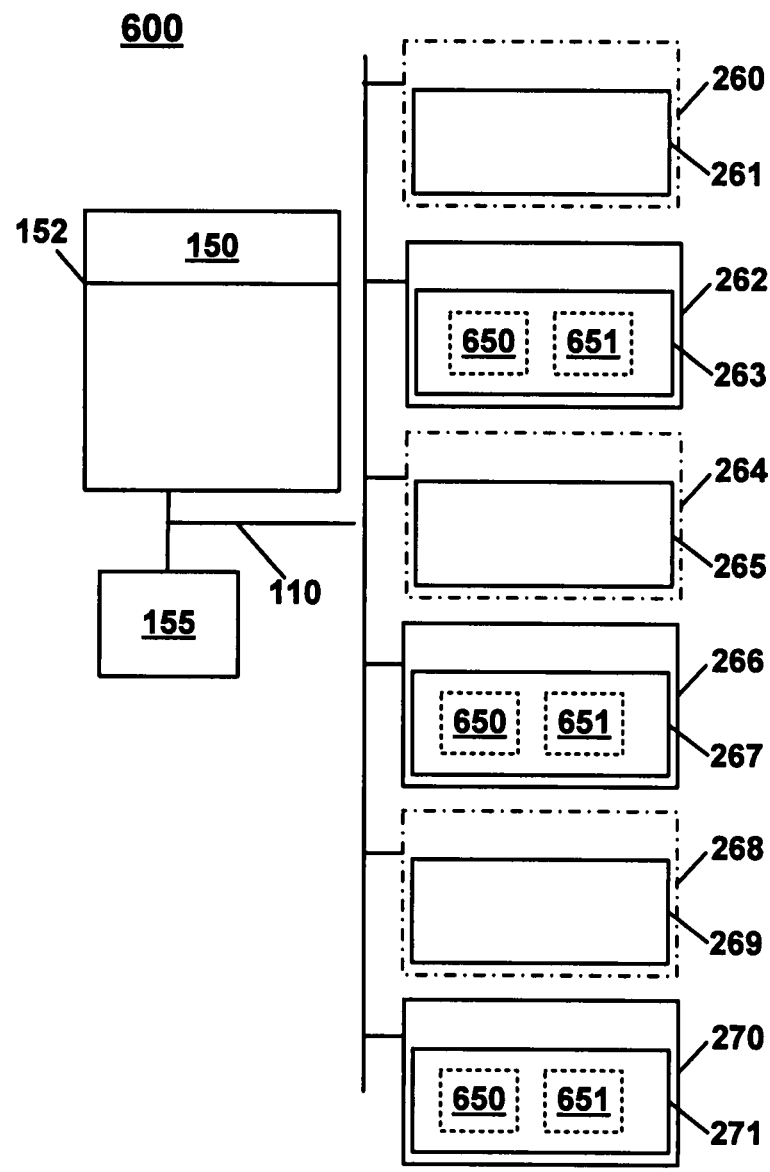
FIG. 6C is a sequential block diagram of FIG. 6B in accordance with the present embodiment of the invention.

FIG. 6C is a sequential block diagram of FIG. 6B. In accordance with an embodiment of the present invention, subsequent to the writing process as described with reference to FIG. 6B, a synchronization process may be performed. Synchronization may or may not automatically occur subsequent to writing processes being completed. In an embodiment of the present invention, the synchronization process can be initiated by an operator of computer system 200. In another embodiment, the synchronization process can be initiated by a computer or application process, and the like. In accordance with an embodiment of the present invention, data representing the physical location of each hard disk drive is incorporated into the synchronization process, so as to achieve a reduction in localized cooling power requirements.

FIG. 6C, a sequential block diagram of a synchronization process commencing subsequent to a writing process as described in FIG. 6B, shows data blocks 650 and 651 have been written from reserve data portion 266 to reserve data portion 263 and reserve data portion 271 of data storage devices 262 and 270, respectively, as determined by NVCM controller 155, and as described herein with reference to FIG. 1. In accordance with an embodiment of the present invention, NVCM controller 155 powers up selected hard disk drives associated with the synchronization process, e.g., data storage devices 262, 266 and 270.

In the example shown, NVCM controller 155 has powered up data storage device 262, 266 and 270, indicated by a solid line, enabling writing data blocks 650 and 651 from reserve data portion 267 to reserve data portions 263 and 271, in an embodiment of the present invention. It is noted that power is not supplied to those hard disk drives not currently engaged in a writing and/or synchronization process, in accordance with an embodiment of the present invention, and indicated with a long dashed, double-dotted line. In accordance with an embodiment of the present invention, NVCM controller 155 marks data blocks 650 and 650 in reserve data portions 263, 267 and 271 as not fully synchronized, as indicated by a dashed line. Subsequent to completion of the writing process and in accordance with an embodiment of the present invention, NVCM controller 155 powers down data storage devices 262, 266 and 270.

Figure 6D:
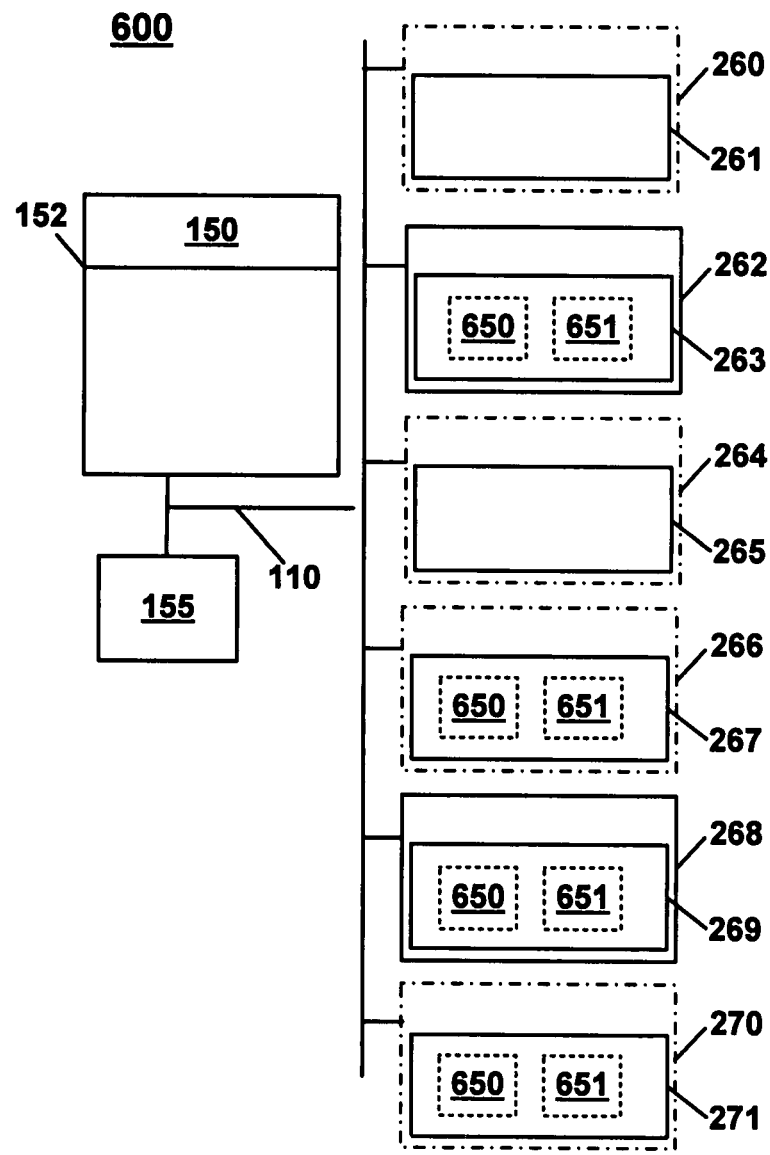
FIG. 6D is a sequential block diagram of FIG. 6C in accordance with the present embodiment of the invention.

FIG. 6D, a sequential block diagram of the continuing synchronization process of FIG. 6C, shows data blocks 650 and 651 have been written from reserve data portion 263 to reserve data portion 269 of data storage devices 268, as determined by NVCM controller 155, and as described herein with reference to FIG. 1. In accordance with an embodiment of the present invention, NVCM controller 155 powers up selected hard disk drives associated with the portion of the synchronization process shown, e.g., data storage devices 262 and 268.

In the example shown, NVCM controller 155 has powered up data storage devices 262 and 268, indicated by a solid line, enabling synchronization of reserve data portions 263 and 269, in an embodiment of the present invention. It is noted that power is not supplied to those hard disk drives not currently engaged in a writing and/or synchronization process (data storage devices 260, 264, 266 and 270, in accordance with an embodiment of the present invention, and indicated with a long dashed, double-dotted line. In accordance with an embodiment of the present invention, NVCM controller 155 marks data blocks 650 and 650 in reserve data portions 263, 267, 269 and 271 as not fully synchronized, as indicated by a dashed line. Subsequent to completion of the writing process and in accordance with an embodiment of the present invention, NVCM controller 155 powers down data storage devices 262 and 268.

Figure 6E:
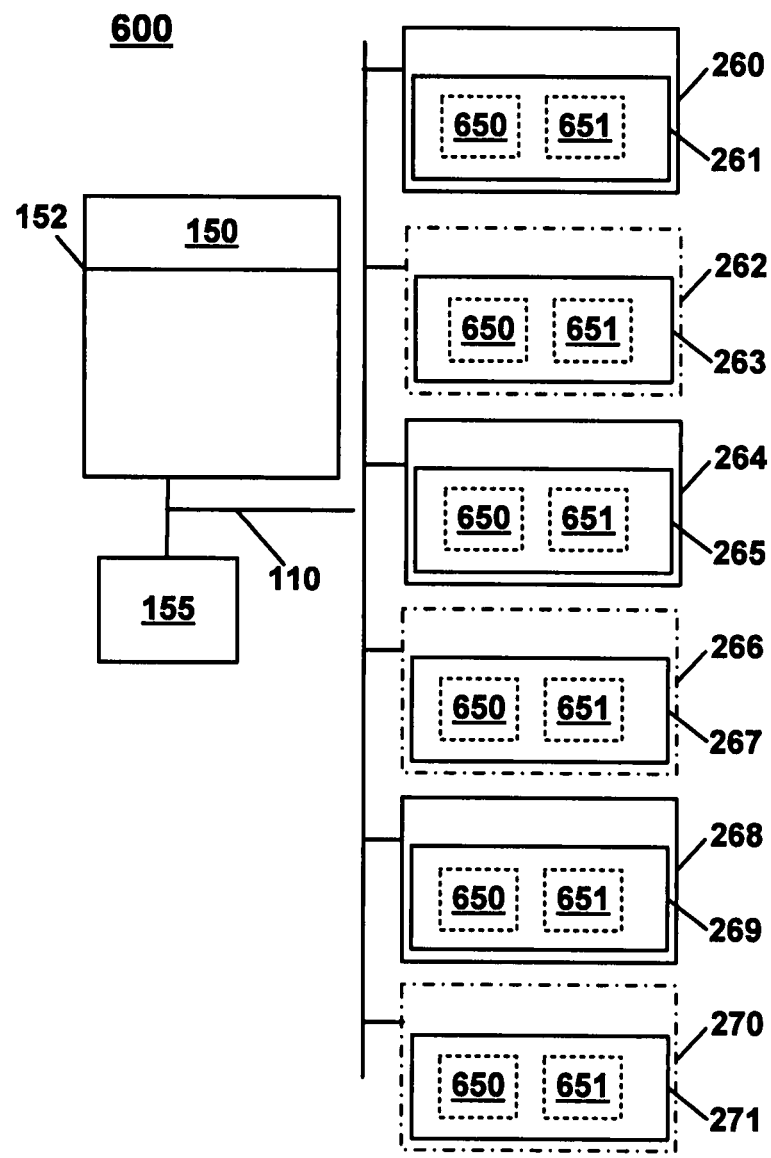
FIG. 6E is a sequential block diagram of FIG. 6D in accordance with the present embodiment of the invention.

FIG. 6E, a sequential block diagram of the continuing synchronization process of FIG. 6D, shows data blocks 650 and 651 have been written from reserve data portion 269 to reserve data portion 261 and reserve data portion 265 of data storage devices 260 and 264, respectively, as determined by NVCM controller 155, and as described herein with reference to FIG. 1. In accordance with an embodiment of the present invention, NVCM controller 155 powers up selected hard disk drives associated with the portion of the synchronization process shown in FIG. 6E, e.g., data storage devices 260, 264 and 268.

In the example shown, NVCM controller 155 has powered up data storage devices 260, 262 and 268, indicated by a solid line, enabling synchronization of reserve data portions 263 and 269, in an embodiment of the present invention. It is noted that power is not supplied to those hard disk drives not currently engaged in a writing and/or synchronization process (data storage devices 264, 266 and 270), in accordance with an embodiment of the present invention, and indicated with a long dashed, double-dotted line. In accordance with an embodiment of the present invention, NVCM controller 155 marks data blocks 650 and 650 in reserve data portions 261, 263, 265, 3, 267, 269 and 271 as not fully synchronized, as indicated by a dashed line. Subsequent to completion of the writing process and in accordance with an embodiment of the present invention, NVCM controller 155 powers down data storage devices 260, 262 and 268.

Figure 6F:
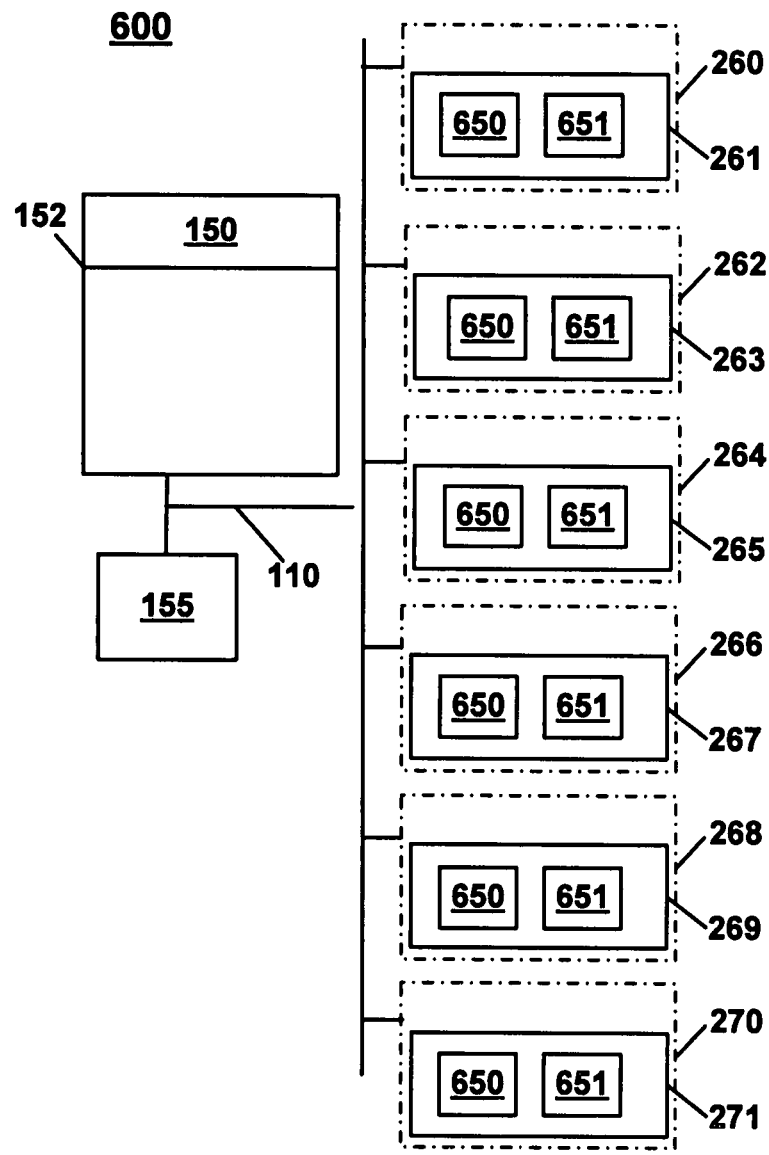
FIG. 6F is a sequential block diagram of FIG. 6E in accordance with the present embodiment of the invention.

FIG. 6F, a sequential block diagram depicting the completion of the synchronization process of FIG. 6D, shows that NVCM controller 155 has determined in an embodiment of the present invention, that data blocks 650 and 651 are fully synchronized, and indicated by a solid line. Synchronization refers to an analogous copy of each data block present in each of the reserve data portions of each of the data storage devices, e.g., data blocks 650 and 651 present in reserve data portions 261, 263, 265, 267, 269 and 271 of data storage devices 260, 262, 264, 266, 268 and 270, respectively.

As described above herein with reference to FIG. 1 and FIGS. 6A-6F, NVCM controller 155 is configurable to geographically regulate to where and when data blocks are to be written during writing and/or a synchronizing processes. By selectively powering up and powering down hard disk drives during the synchronization process, embodiments of the present invention may achieve a reduction in localized radiated heat generation, thus achieving a reduction in cooling expense.

Figure 7:
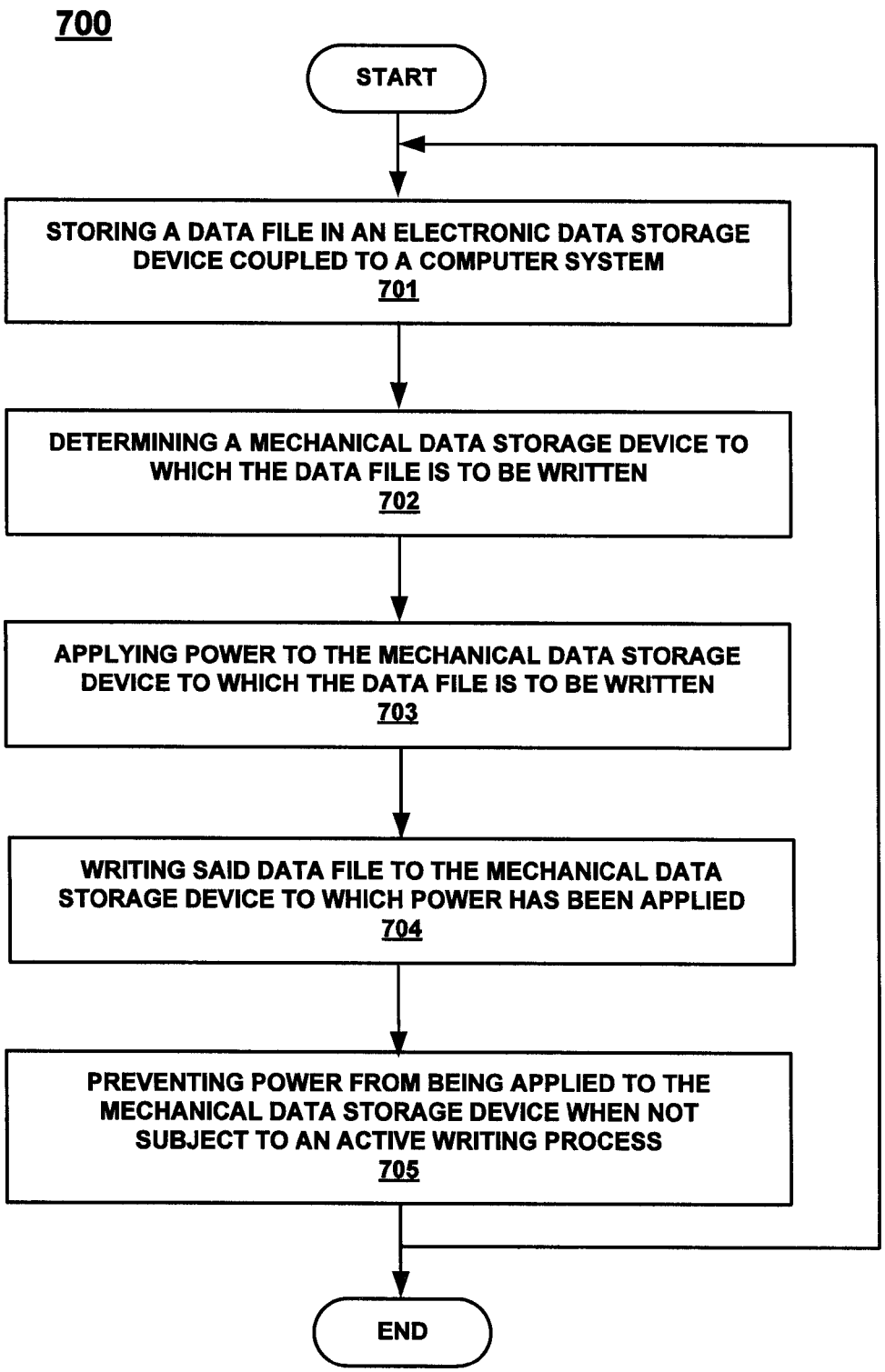
FIG. 7 is a flowchart of a process for power optimization in a computer system in accordance with an embodiment of the present invention.

FIG. 7 is a flowchart of a process 700 for conserving power in a computer system in accordance with an embodiment of the present invention. FIG. 7 is a flow chart of a process 700 in which particular steps are performed in accordance with an embodiment of the present invention for component to component mounting. Although specific steps are disclosed in process 700, such steps are exemplary. That is, the present invention is well suited to performing various other steps or variations of the steps recited in FIG. 7. Within the present embodiment, it should be appreciated that the steps of process 700 may be performed by software, by hardware, by an assembly mechanism, through human interaction, or by any combination of software, hardware, assembly mechanism, and human interaction.

Process 700 for power conservation in a computer system will be described with reference to components and devices shown in FIGS. 1, 2, 4A-4C, 5A-5E and 6A-6F in accordance with embodiments of the present invention.

In step 701 of process 700, data is stored in a non-volatile cache memory device of a computer system, e.g., NVCM 150 of computer systems 100 and 200, in an embodiment of the present invention. In an embodiment, NVCM 150 may comprise a threshold level, e.g., storage volume limit 152, configured, controlled and monitored by NVCM controller 155 as described herein with reference to FIG. 1.

In an embodiment of the present invention, a process to write data stored in NVCM 150 to a hard disk drive is initiated, e.g., writing data blocks 451-459 of FIGS. 4A-4C and data blocks 551-559 of FIGS. 5A-5E to data storage devices 160 and 162. In an alternative embodiment of the present invention, FIGS. 6A-6F illustrate an implementation in a server computer system. In an embodiment, a write process is initiated by NVCM controller 155, alone or in combination with computer system 100. In another embodiment, a write process is operator initiated.

In step 702, NVCM controller 155 determines which hard disk drive the data is to be written, in accordance with an embodiment of the present invention. Factors used in determining the hard disk drive to which the data blocks are to be written can include, but is not limited to, storage capacities, data access time, power requirements, physical location, and other performance and operating characteristics, as described herein with reference to FIG. 1.

In step 703 of process 700 for power conservation, NVCM controller 155 enables power to be selectively applied to the hard disk drive to which the data is to be written, e.g., data storage device 160 of FIGS. 4A-4C and 5A-5E, in accordance with embodiments of the present invention. FIGS. 6A-6F illustrates another embodiment of the present invention for selectively applying power to hard disk drives.

In step 704 of process 700, NVCM controller 155 causes writing of the data from the NVCM 150 to the selected hard disk, in an embodiment of the present invention, as described herein with reference to FIGS. 4A-4C, 5A-5E and 6A-6F.

In step 705 of process 700, subsequent to completion of the writing process, NVCM controller 155 restricts power from being applied to a data storage device or devices that are not subject to active read/write process being performed thereon, as described herein with reference to FIGS. 4A-4C, 5A-5E and 6A-6F. By selectively controlling power applied to hard disk drives, embodiments of the present invention achieve a reduction in consumed power and radiated heat generation during computer system operation.

Embodiments of the present invention, in the various presented embodiments, provide a system and method for power optimization in a computer system.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A power conservation system for a computer system, said power conservation system comprising;
    a non-volatile cache memory (NVCM) device for storing information, said NVCM device operationally coupled to said computer system, said NVCM device having a threshold storage volume for said information;
    at least one data storage device coupled to said computer system, each of said at least one data storage device comprising an allocated portion for storing only said information from said NVCM device, said NVCM device and said at least one data storage device being separate devices and wherein said NVCM device is operational when said at least one data storage device is powered down; and
    a controller coupled to said computer system, said controller for selective application of power to said at least one data storage device for enabling reading said information from or writing said information to said at least one data storage device, wherein said controller determines if said threshold storage volume of said NVCM device is reached, and in response, said controller enables powering up of said at least one data storage device and enables writing of said information to said at least one data storage device and wherein said controller determines if said threshold storage volume of said NVCM device is not reached, and in response, said controller enables powering down of said at least one data storage device and enables writing of said information to said NVCM device,
    wherein after said writing of said information to said at least one data storage device, said controller powers down said at least one data storage device that received said information,
    wherein said controller is configured to, subsequent to a powering down of said at least one data storage device that received said information, synchronize said at least one data storage device, wherein said controller enables power to be applied to each data storage device of said at least one data storage device during active synchronization concurrent with restricting power from being applied to those data storage devices of said at least one storage device that are not subjected to said synchronization, and
    wherein said controller geographically regulates to where and when said information is to be written during at least one of said writing and synchronizing processes, such that a reduction in localized radiated heat generation is achieved, thus enabling a reduction in cooling expense.

2. The power conservation system as recited in claim 1 wherein said controller is configured to select which data storage device of said at least one data storage device that is to receive transfer of said information.

3. The power conservation system as recited in claim 2 wherein said controller is configured to selectively enable power applied to said selected data storage device during said transfer of said information.

4. The power conservation system as recited in claim 1 wherein said NVCM device is a flash memory device.

5. The power conservation system as recited in claim 4 wherein said flash memory device is Robson flash memory.

6. A non-transitory computer-usable medium having computer-readable program code embodied therein for causing a computer system to perform a method of power conservation, the method comprising:
    storing information in a non-volatile cache memory (NVCM) device, said NVCM device coupled with said computer system, said NVCM device having a threshold storage volume for said information;
    determining a status of at least one data storage device coupled to said computer system, said NVCM device and said at least one data storage device being separate devices and wherein said NVCM device is operational when said at least one data storage device is powered down; and
    writing said information from said NVCM device to a pre-allocated portion of said at least one data storage device or writing said information from said at least one data storage device to said NVCM device, said writing causing powering up of said at least one data storage device, said pre-allocated portion of said at least one data storage device for only storing said information from said NVCM device, wherein if said threshold storage volume of said NVCM device is reached, enabling powering up of said at least one data storage device and enabling writing of said information to said at least one data storage device and wherein if said threshold storage volume of said NVCM device is not reached, enabling powering down of said at least one data storage device and enables writing of said information to said NVCM device,
        wherein after said writing of said information to said pre-allocated portion of said at least one data storage device, said controller powers down said at least one data storage device that received said information;
    subsequent to a powering down of said at least one data storage device that received said information, synchronizing said at least one data storage device, wherein said controller enables power to be applied to each data storage device of said at least one data storage device during active synchronization concurrent with restricting power from being applied to those data storage devices of said at least one storage device that are not subjected to said synchronization; and
    geographically regulating, by said controller, to where and when said information is to be written during at least one of said writing and synchronizing processes, such that a reduction in localized radiated heat generation is achieved, thus enabling a reduction in cooling expense.

7. The computer-usable medium of claim 6, wherein the computer-readable program code embodied therein causes said computer system to perform said method, said method further comprising:
   determining which data storage device of said at least one data storage device coupled to said computer system is to receive said information, when said computer system is configured with said at least one data storage device.

8. The computer-usable medium of claim 6, wherein the computer-readable program code embodied therein causes a computer to perform said method, said method further comprising:
   preventing power from being supplied to said at least one data storage device when said writing to or reading from said at least one data storage device is not being performed.

9. The computer-usable medium of claim 6, wherein the computer-readable program code embodied therein causes a computer to perform said determining, said determining further comprising:
   comparing criteria associated with operational expense related to each data storage device of said at least one data storage device.

10. The computer-usable medium of claim 6, wherein the computer-readable program code embodied therein causes a computer to perform said method, wherein said method further comprising:
    implementing NAND flash memory as said NVCM device.

11. A method for conserving power in a computer system, said method comprising:
    storing information in an allocated portion of a non-volatile cache memory (NVCM) device coupled to said computer system, said NVCM device having a threshold storage volume for said information;
    determining a state of at least one data storage coupled to said computer system and from which said information is retrieved and/or to which said information is to be written, said NVCM device and each of said at least one data storage device being separate devices and wherein said NVCM device is operational when said at least one data storage device is powered down; and
    writing said information to a pre-allocated portion of said at least one data storage device, said at least one data storage device being an efficient data storage device relative to writing said information to another of said at least one data storage device, wherein if said threshold storage volume of said NVCM device is reached, enabling powering up of said at least one data storage device and enabling writing of said information to said at least one data storage device and wherein if said threshold storage volume of said NVCM device is not reached, enabling powering down of said at least one data storage device and enables writing of said information to said NVCM device,
    wherein after said writing of said information to said pre-allocated portion of said at least one data storage device, said controller powers down said at least one data storage device that received said information;
    subsequent to a powering down of said at least one data storage device that received said information, synchronizing said at least one data storage device, wherein said controller enables power to be applied to each data storage device of said at least one data storage device during active synchronization concurrent with restricting power from being applied to those data storage devices of said at least one storage device that are not subjected to said synchronization; and
    geographically regulating, by said controller, to where and when said information is to be written during at least one of said writing and synchronizing processes, such that a reduction in localized radiated heat generation is achieved, thus enabling a reduction in cooling expense.

12. The method as recited in claim 11 further comprising:
    selectively applying power to said efficient at least one data storage device to which said information is to be written concurrent with restricting application of power to each said another data storage device of said at least one data storage devices.

13. The method as recited in claim 11 wherein said determining further comprises:
    utilizing time consumption as criteria to determine said efficient data storage device.

14. The method as recited in claim 11 wherein said determining further comprises:
    utilizing energy consumption as criteria to determine said efficient data storage device.

15. The method as recited in claim 11 further comprising:
    utilizing heat generation and dissipation information as criteria to determine said at least one data storage device.

16. The method as recited in claim 11 further comprising:
    allocating a portion of each data storage device of said at least one data storage device for storing said information.

* * * * *